Oct. 7, 1958     G. E. GOLLWITZER     2,854,743
METHOD OF DISPLACING AND REMOVING FLASH FROM A WELDED JOINT
Filed Feb. 21, 1955     2 Sheets-Sheet 1

INVENTOR.
George Elton Gollwitzer
BY

Oct. 7, 1958   G. E. GOLLWITZER   2,854,743
METHOD OF DISPLACING AND REMOVING FLASH FROM A WELDED JOINT
Filed Feb. 21, 1955   2 Sheets-Sheet 2

INVENTOR.
George Elton Gollwitzer
BY 2,854,743

METHOD OF DISPLACING AND REMOVING FLASH FROM A WELDED JOINT

George Elton Gollwitzer, McKeesport, Pa., assignor to Kelsey-Hayes Company, a corporation of Delaware Application February 21, 1955, Serial No. 489,488

8 Claims. (Cl. 29—481)

The invention relates to the manufacture of welded articles and refers more particularly to the removal of weld flash from blanks having butt welded joints.

In blanks having butt welded joints, the weld flash extends at the sides and edges of the blanks and in the manufacture of annular blanks and more particularly annular tire rim blanks with butt welded joints it has been the usual practice to trim both the sides and edges of these blanks by cutters.

The invention has for one of its objects to provide an improved method of removing the flash which can be carried out more rapidly and is more economical.

The invention has for another object to provide a flash removing method in which the flash at an edge of the blank is displaced and then removed while removing the flash at the opposite sides of the blank.

These and other objects will become apparent from the following description taken in connection with the accompanying drawings in which.

Figure 1:
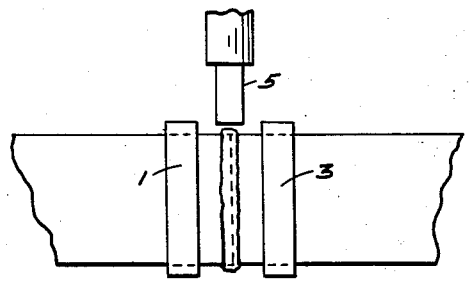
Figures 1 and 2 are schematic views illustrating apparatus employed in butt welding adjacent ends of an annular rim blank together and displacing the flash at an edge of the blank.
Figure 2:
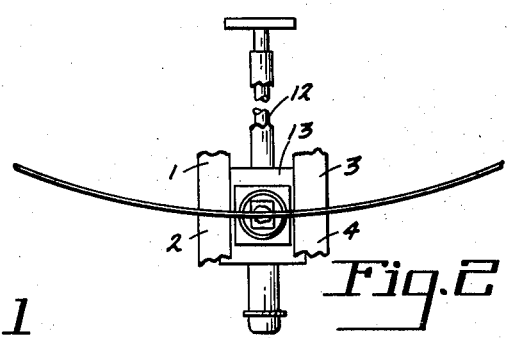
Figure 4:
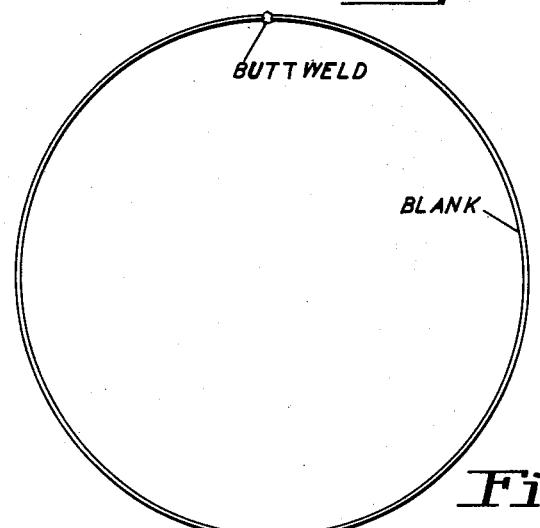
Figure 4 is an edge elevation of a butt welded rim blank.
Figure 5:
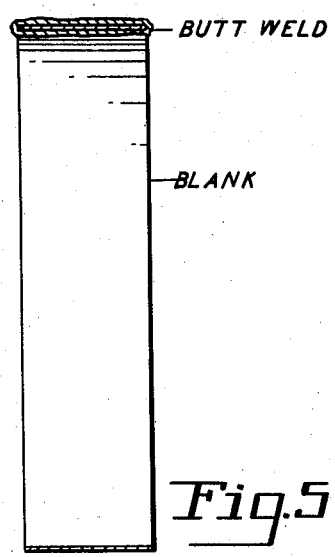
Figure 5 is a side elevation partly in section.
Figure 6:
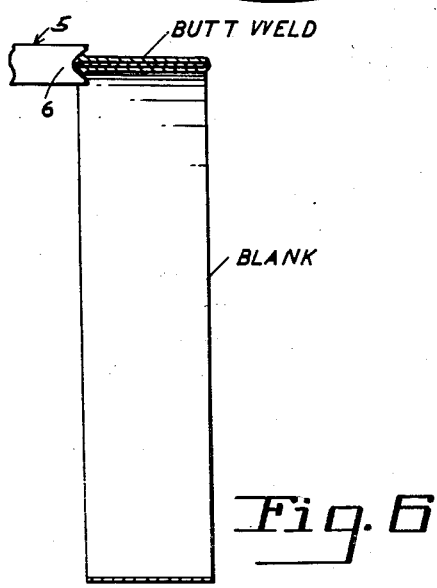
Figures 6 and 7 are similar views illustrating subsequent steps in the manufacture.
Figure 7:
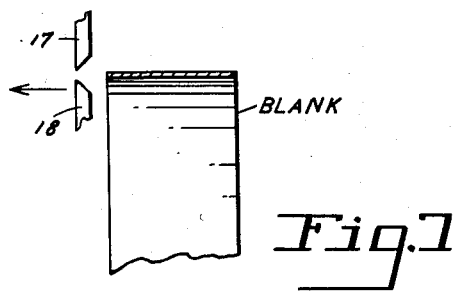
Figure 3:
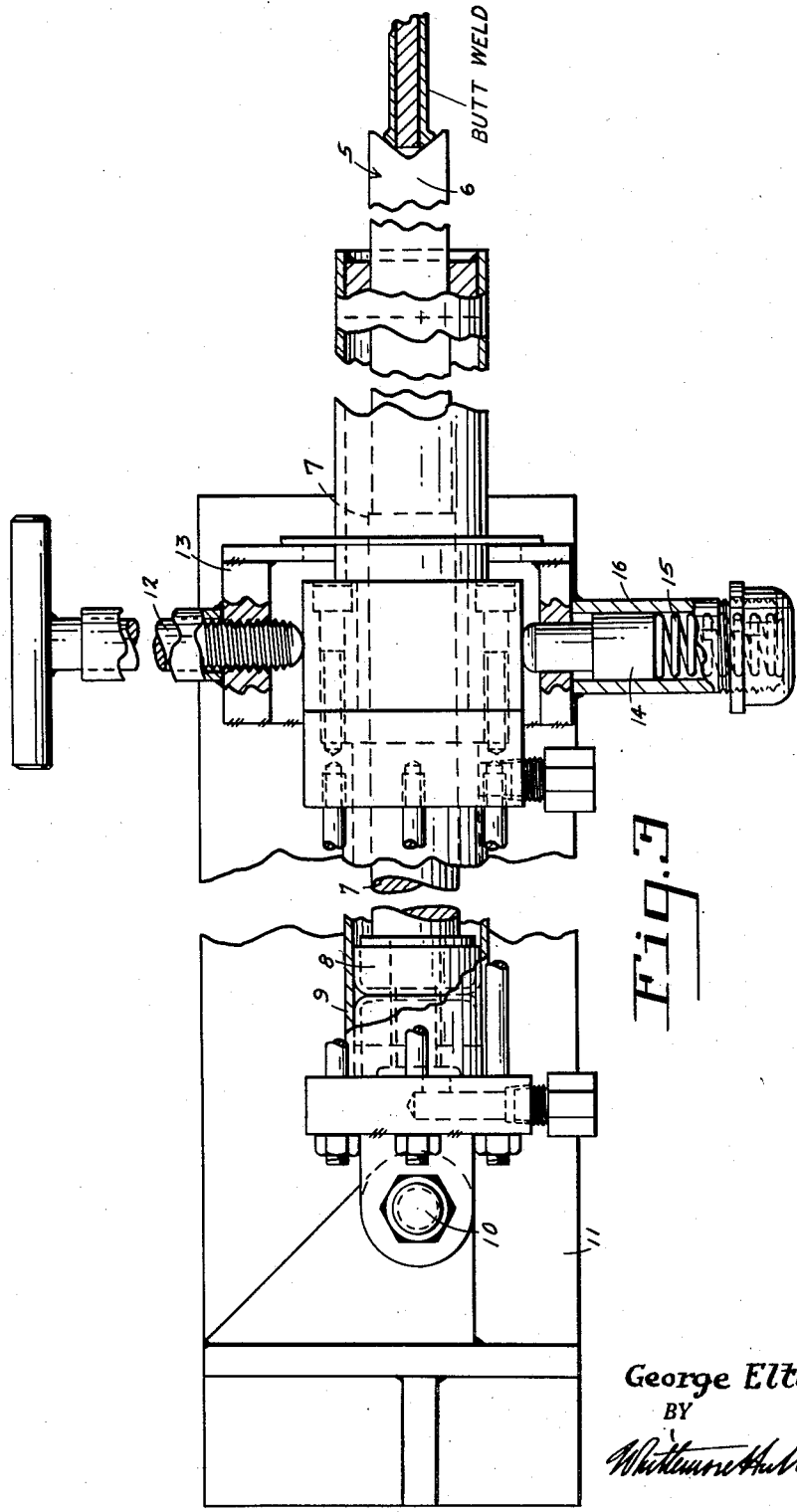
Figure 3 is a side elevation partly in section of the apparatus for displacing the flash at an edge of the blank.

As illustrated in the present instance, the welded article is an annular tire rim blank which is formed from a flat rectangular sheet metal blank by hooping the flat blank and placing the hooped blank in a conventional welding machine. This welding machine has the pair of upper and lower electrodes 1 and 2 respectively engageable with one end of the hooped blank, and the pair of upper and lower electrodes 3 and 4 respectively engageable with the other end of the hooped blank, the upper electrodes being movable downwardly to cooperate with their respective lower electrodes to tightly clamp the hooped blank ends. After the ends have been clamped, the pair of electrodes 3 and 4 is moved toward the pair of electrodes 1 and 2 and connected to a source of electric current and the ends of the hooped blank are butt welded together in the usual manner with flash extending at the edges and sides of the welded blank and completely around the welded joint. The electric circuit is broken at the end of the butt welding step and then while the welded joint is still clamped by the electrodes and retains enough of the welding heat to be plastic, the flash at one edge of the welded blank is displaced to both sides by the coining unit 5. This unit is mounted on the welding machine and has the forging hammer 6 in the nature of a rectangular bar secured at one end to the piston rod 7 which in turn has secured thereto the piston 8 slidable in the cylinder 9. The free end of the rod 6 is V-shaped in the present instance so that as the rod is forced outwardly against the flash, it displaces this flash to the inner and outer sides of the welded blank. To properly locate the V-shaped end of the rod, the cylinder 9 is pivotally mounted at 10 on a plate 11 secured to a stationary welder platen of the welding machine and the cylinder is adapted to be angularly adjusted by an upright screw 12 threaded in a support 13 and engaging the upper side of the cylinder 9, the lower side being engaged by the plunger 14 forced upwardly by the coil spring 15. The plunger 14 and coil spring 15 are located in a housing 16 carried by the support 13. This support is mounted on the plate 11.

After the flash at one edge of the welded blank has been displaced, the blank is then removed from the welding machine and placed in a trimmer having the cutters 17 and 18 engageable with the flash at the opposite sides of the welded blank and movable in a direction toward the edge of the blank from which the flash had been displaced. These cutters tend to draw the flash at the edge of the welded blank initially engaged and remove this flash along with the flash at the opposite sides and after the operation of the cutters the welded blank is then in condition for the subsequent steps in forming the welded blank to the desired cross-sectional contour of the tire rim.

While the blank having a butt welded joint is a tire rim blank as illustrated, the method is equally applicable to other blanks such as those formed of separate pieces butt welded together. Also the flash at both edges of the butt welded blank may be displaced if desired before being trimmed.

What I claim as my invention is:

1. The method of removing the flash from a butt welded joint characterized by flash extending beyond an edge of the joined material which adjoins a side thereof, comprising the steps of displacing the flash extending beyond said edge relative to said material in a manner to dispose said flash on said side and substantially entirely inwardly of said edge, and cutting away the flash at said side of the material, including the displaced flash, by a cutting operation performed longitudinally of said joint.

2. The method of removing the flash from an annular blank having a butt welded joint characterized by flash extending beyond an edge of the blank which adjoins a side thereof, comprising the steps of displacing the flash extending beyond said edge relative to the blank in a manner to dispose said flash on said side and substantially entirely inwardly of said edge, and cutting away the flash at said side of the blank, including the displaced flash, by a cutting operation performed longitudinally of said joint.

3. The method of removing the flash from an annular blank having a butt welded joint characterized by flash extending beyond an edge of the blank which adjoins a side thereof, comprising the steps of displacing the flash extending beyond said edge relative to the blank in a manner to dispose said flash on said side and substantially entirely inwardly of said edge, said step being performed while the flash is still plastic from the welding heat, and cutting away the flash at said side of the blank, including the displaced flash, by a cutting operation performed longitudinally of said joint.

4. The method of removing the flash from an annular blank having a butt welded joint characterized by flash extending beyond opposite edges of the blank which adjoins opposite sides thereof, comprising the steps of displacing the flash extending beyond said edges relative to the blank in a manner to dispose said flash on said sides and substantially entirely inwardly of said edges, and cutting away the flash on at least one of said sides of the blank, including the displaced flash, by a cutting operation performed longitudinally of said joint.

5. The method of removing the flash from an annular blank having a butt welded joint characterized by flash extending beyond opposite edges of the blank which adjoins opposite sides thereof, comprising the steps of displacing the flash extending beyond said edges relative to the blank in a manner to dispose said flash on said sides and substantially entirely inwardly of said edges, said step being performed while the flash is still plastic from the welding heat, and cutting away the flash on at least one of said sides of the blank, including the displaced flash, by a cutting operation performed longitudinally of said joint.

6. The method of forming a butt welded joint, comprising the steps of butt welding ends of blank material to form a joint characterized by flash extending from a side of the blank material as well as beyond an edge of said material adjoining said side, displacing the flash extending beyond said edge in relation to said blank material to locate said flash on said side and substantially entirely inwardly of said edge, and cutting away the flash at said side, including the displaced flash, by a cutting operation performed longitudinally of said joint.

7. The method of forming a butt welded joint, comprising the steps of butt welding ends of blank material to form a joint characterized by flash extending from a side of the blank material as well as beyond an edge of said material adjoining said side, displacing the flash extending beyond said edge in relation to said blank material to locate said flash on said side and substantially entirely inwardly of said edge, said step being performed while the flash is still plastic from the welding heat, and cutting away the flash at said side, including the displaced flash, by a cutting operation performed longitudinally of said joint.

8. The method of removing all of the weld flash from a butt welded joint of a thin flat blank having flash on both sides and extending beyond opposite edges of the blank, comprising the steps of displacing the flash extending beyond one edge of the blank to a side of the blank, and then cutting away the flash at both sides of the blank including the displaced flash by cutters moving toward said one edge of the blank from the opposite edge thereof, and drawing the flash at said opposite edge of the blank by such movement of the cutters for removal thereof simultaneously with the flash at opposite sides of the blank.

References Cited in the file of this patent
UNITED STATES PATENTS

| | | |
|---|---|---|
| 1,832,719 | McBerty | Nov. 17, 1931 |
| 1,914,810 | Kraeft | June 20, 1933 |
| 1,954,511 | Adams | Apr. 10, 1934 |
| 2,066,647 | Rodman | Jan. 5, 1937 |